United States Patent [19]

Marquis et al.

[11] 4,131,186
[45] Dec. 26, 1978

[54] TIMER CONSTRUCTION AND CLUTCH CONSTRUCTION THEREFOR OR THE LIKE

[75] Inventors: Edgar E. Marquis, Newtown; Joseph Discepolo, Waterbury, both of Conn.

[73] Assignee: Robertshaw Controls Company, Richmond, Va.

[21] Appl. No.: 829,453

[22] Filed: Aug. 31, 1977

[51] Int. Cl.$^2$ ............................ F16D 11/10; F16D 41/12
[52] U.S. Cl. ........................................ 192/67 R; 192/46
[58] Field of Search ............................... 192/46, 67 R

[56] References Cited

U.S. PATENT DOCUMENTS

| | | | |
|---|---|---|---|
| 1,382,406 | 6/1921 | Beadle | 192/46 |
| 1,832,805 | 11/1931 | Brewster | 192/46 |
| 2,010,528 | 8/1935 | Schofield et al. | 192/46 X |
| 3,378,123 | 4/1968 | Papa, Jr. | 192/67 R |
| 3,652,870 | 3/1972 | Niemand | 307/133 |
| 3,857,467 | 12/1974 | Hulterstrum | 192/67 R X |

*Primary Examiner*—Allan D. Herrmann
*Attorney, Agent, or Firm*—Candor, Candor & Tassone

[57] ABSTRACT

A timer construction having a timer motor and a selectable time period unit adapted to be interconnected to the timer motor of a clutch construction to drive the time period unit for a selected time period, the clutch unit including a first rotatable member driven by the timer motor and having a plurality of teeth arranged in a ring-like circular array and a second rotatable member being axially movable and having a plurality of teeth on the outer periphery thereof. The second member is operatively interconnected to the time period unit and is adapted to have some of its teeth mesh with at least some of the teeth of the first member to be driven thereby when the second member is axially moved into the circular array of teeth of the first member. Each tooth of the first member comprises a leg having one end secured to a flat face of the first member and having the other end thereof disposed in cantilever fashion, each leg having a tooth face that extends between the ends thereof, is substantially flat, faces at an angle to the axis of rotation of the first member and has an inner edge that is angled relative to such axis of rotation.

12 Claims, 5 Drawing Figures

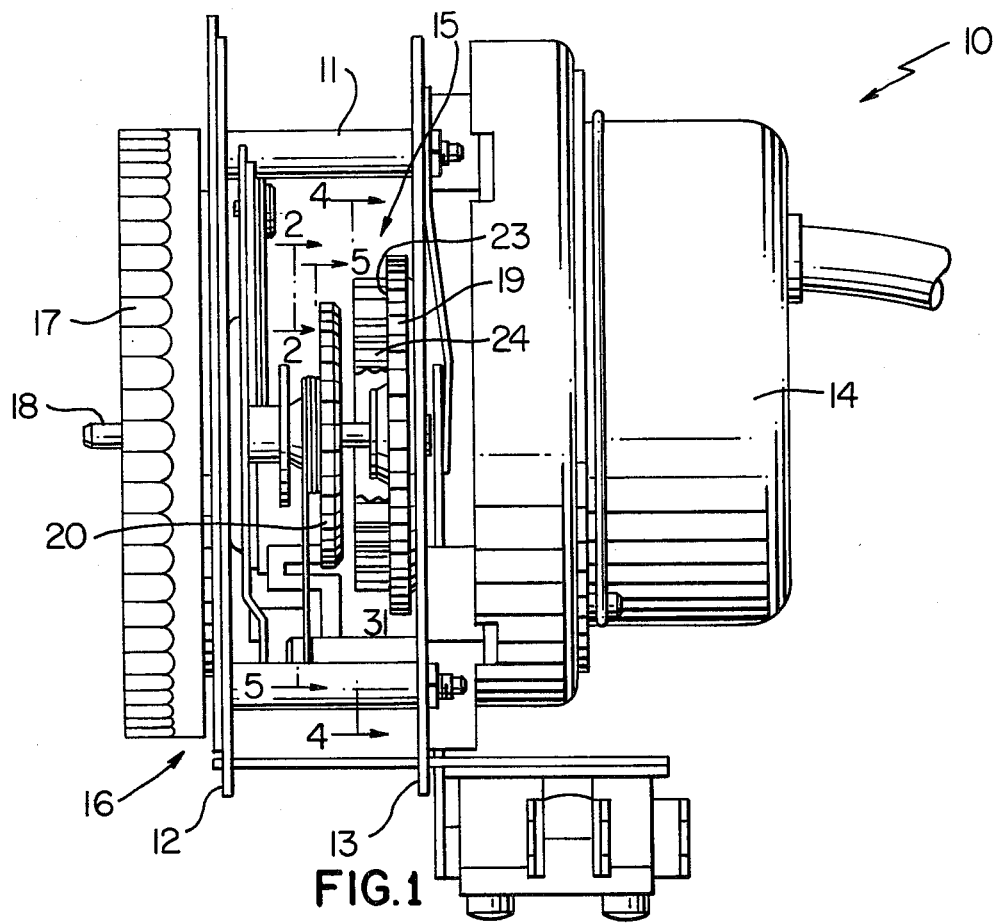
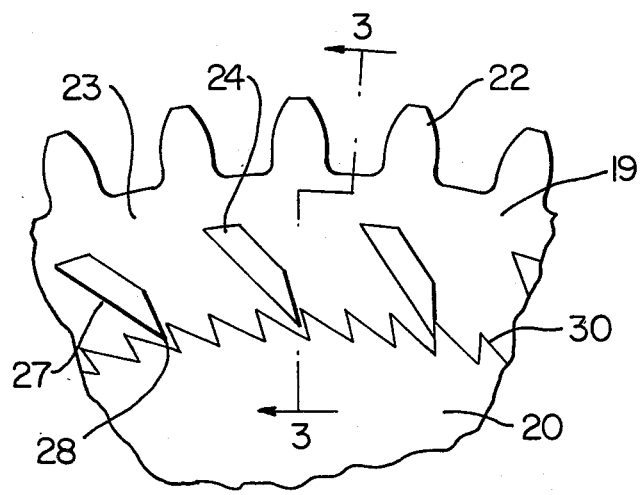
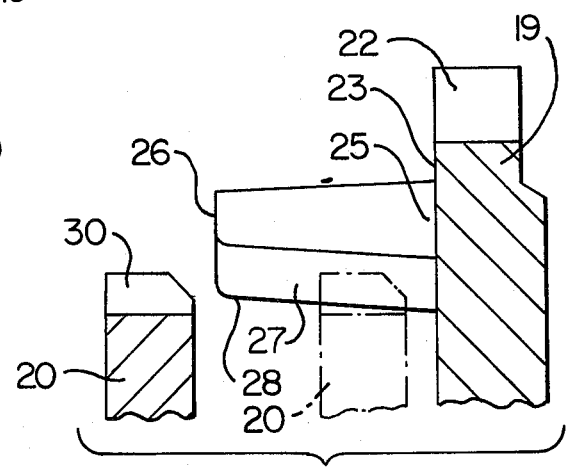

TIMER CONSTRUCTION AND CLUTCH CONSTRUCTION THEREFOR OR THE LIKE

BACKGROUND OF THE INVENTION

FIELD OF SEARCH

This invention relates to an improved timer construction and to an improved clutch construction for such a timer construction or the like.

PRIOR ART STATEMENT

It is well known to provide a timer construction having a timer motor and a selectable time period means adapted to be interconnected to the timer motor by a clutch means to drive the time period means for a selected time period.

For example, see the following:
U.S. Patent No. 3,652,870 - Niemand
Robertshaw Controls Company timer movement No. 606/001
U.S. Patent No. 3,378,123-Papa, Jr.

The timer construction of U.S. Patent No. 3,652,870 has a first rotatable clutch member driven by a timer motor and is provided with a plurality of projections on the face thereof and against which a rubber face of a second rotatable clutch member is axially engaged to clutch the two rotatable members together and thereby drive the selectable time period means that is operatively interconnected to the second clutch member for a selected time period.

The timer construction of Robertshaw Controls Company timer movement No. 606/001 has a first rotatable clutch member driven by the timer motor and is provided with a face gear on one side thereof and against which a plurality of prongs of a second rotatable clutch member engages thereagainst to clutch the two rotatable members together and thereby drive a selectable time period means that is operatively interconnected to the second rotatable clutch member for a selected time period.

The timer clutch of U.S. patent No. 3,378,123 is similar to the above and has a plurality of teeth formed on a radial face of a driving element against which a plurality of pawls of a driven member are adapted to engage to clutch the members together, this patent stating in lines 47-51 of column 5 thereof, that while the teeth are illustrated as being on a radial face of the driving element, it would be appreciated that it could be formed on a conical or cylindrical face with compensating modification of the pawls on the driven element.

SUMMARY OF THE INVENTION

It is a feature of this invention to provide an improved clutch construction for a timer construction or the like wherein the clutch construction has improved accuracy and repeatability.

In particular, one embodiment of this invention provides a timer construction having a timer motor and selectable time period means adapted to be interconnected to the timer motor by a clutch means to drive the timer means for a selected time period. The clutch means comprises a first rotatable member driven by the timer motor and having a plurality of teeth arranged in a ring-gear like circular array. A second rotatable member is axially movable and has a plurality of teeth on the outer periphery thereof, the second member being operatively interconnected to the time period means and being adapted to have some of its teeth mesh with at least some of the teeth of the first member to be driven thereby when the second member is axially moved into the circular array of teeth of the first member. Each tooth of the first member comprises a leg having opposed ends of which one thereof is secured to the first member and the other end thereof is disposed in cantilevered fashion relative to the first member. Each leg has a tooth face that extends between the ends thereof and is substantially flat, each tooth face facing at an angle to the axis of rotation of the first member and each tooth face having an inner edge that is angled relative to the axis of rotation of the first member. The first member has a flat surface disposed substantially perpendicular to the axis of rotation thereof, the legs being secured to the flat surface and extending substantially perpendicular thereto.

Accordingly, it is an object of this invention to provide an improved timer construction having one or more of the novel features of this invention as set forth above or hereinafter shown or described.

Another object of this invention is to provide an improved clutch construction having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a side view of the improved timer construction of this invention with the clutch construction of this invention in an unclutched condition thereof.

FIG. 2 is an enlarged, fragmentary, cross sectional view taken substantially in the direction of the arrows 2—2 of FIG. 1.

FIG. 3 is a fragmentary, cross-sectional view taken substantially on the line 3—3 of FIG. 2.

DESCRIPTION OF THE PREFERRED EMBODIMENT

Figure 5:
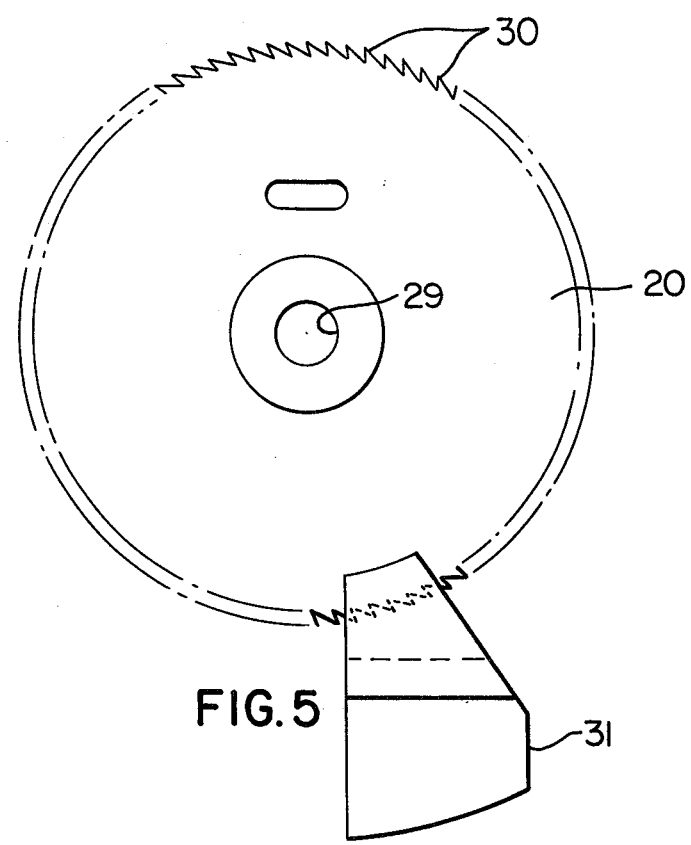
FIG. 5 is an enlarged view of another clutch member of the clutch construction of FIG. 1 and is taken in the direction of the arrows 5—5 of FIG. 1.

While the various features of this invention are hereinafter described and illustrated as being particularly adapted to provide a clutch construction for a timer construction, it is to be understood that the various features of this invention can be utilized singly or in any combination thereof to provide a clutch construction for other structure as desired.

Therefore, this invention is not to be limited to only the embodiments illustrated in the drawings, because the drawings are merely utilized to illustrate one of the wide variety of uses of this invention.

Referring now to FIG. 1, the improved timer construction of this invention is generally indicated by the reference numeral 10 and comprises a frame means 11 carrying frame plates 12 and 13 and electrical timer motor 14 that is adapted to drive through a clutch construction of this invention that is generally indicated by the reference numeral 15 in a manner to operate a selectable time period unit that is generally indicated by the reference numeral 16 and is also carried by the frame means 11.

In particular, the selectable time period unit 16 includes a selector knob 17 that is adapted to be turned to a desired selected time period, such as five minutes, and then a push button means 18 of the time period unit or means 16 is adapted to be pushed axially inwardly into the timer means 10 to engage the clutch construction 15 and thereby drive the time period unit 16 through the selected time period at the lapse of which the clutch means 15 is automatically operated to the unclutched condition of FIG. 1 to thereby terminate the operation of the timer construction 10 in a manner conventional in the art.

In particular, the timer construction 10, except for the improved clutch construction 15 thereof, is substantially identical in structure and operation to the timer construction illustrated and described in the aforementioned U.S. Patent to Neimand, No. 3,652,870 whereby the details of the timer means 10 need not be further described in order to understand the improved features of this invention which are directed to the improved clutch means 15 for the timer means 10.

The clutch construction 15 of this invention comprises a first rotatable clutch member 19 driven by the timer motor 14 and a second rotatable clutch member 20 operatively interconnected to the time period unit 16 and being adapted to be axially moved from the unclutched position illustrated in FIG. 1 and FIG. 3 into the clutched condition illustrated by dash-dotted lines in FIG. 3 to thereby clutch the timer motor 14 to the time period unit 16 to operate the same through the selected time period.

Figure 4:
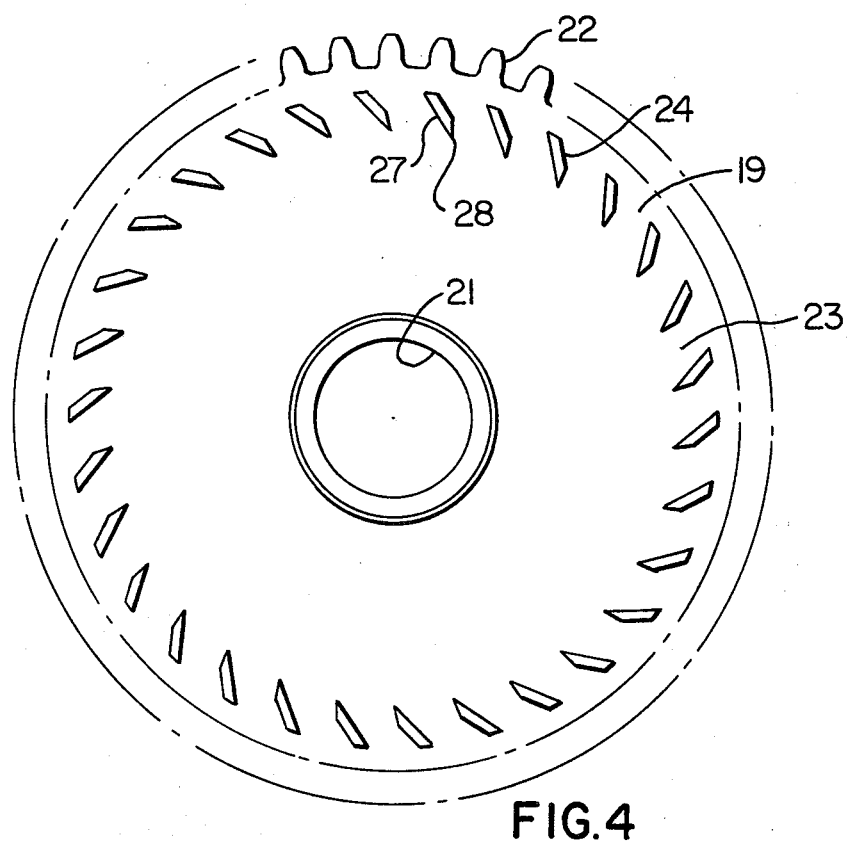
FIG. 4 is an enlarged view of one of the rotatable clutch members of the clutch construction of FIG. 1 and is taken in the direction of the arrows 4-4 thereof.

The rotatable clutch member 19 is rotatably mounted to the frame means 11 by a suitable frame shaft passing through a center opening 21 of the rotatable member 19 as illustrated in FIG. 4.

The rotatable clutch member 19 has outwardly directed peripheral teeth 22 adapted to be disposed in meshing relation with a pinion gear (not shown) of the timer motor 14 in a manner conventional in art to thereby substantially continuously rotate the clutch member 19 in a particular direction.

The rotatable clutch member 19 has a substantially flat front face 23 carrying a plurality of gear-like teeth or legs 24 disposed substantially perpendicular to the face 23 and disposed in the ring-gear like circular array illustrated in the drawings with each tooth 24 comprising a leg-like member having an inner end 25 secured to the face 23 of the rotatable member 19 while an outer end 26 of each leg 24 is disposed spaced therefrom in cantelivered fashion, the legs 24 being so constructed and arranged so that the same are substantially equally spaced radially about the axis of rotation of the member 19 and in the embodiment illustrated in the drawings, thirty legs 24 are provided for a purpose hereinafter described.

As illustrated in FIGS. 3 and 4, each tooth or leg 24 of the rotatable clutch member 19 has an angled flat inner face 27 disposed at an angle relative to the axis of rotation of the member 19 and is provided with a lower edge 28 that is also disposed at an angle relative to the axis of rotation of the member 19 as illustrated.

While the rotatable clutch member 19 can be formed of any suitable material, it is found that the rotatable member 19 can be formed of molded plastic material, such as Delrin 500 sold by the E. I. dePont De Nemours Company, Inc. of Wilmington, Delaware, whereby the teeth or legs 24 thereof are integral with the member 19 and are flexible for a purpose hereinafter described.

The other rotatable clutch member 20 of the clutch construction 15 of this invention is also adapted to be rotatably mounted on suitable frame shaft means that passes through a central opening means 29 thereof as illustrated in FIG. 5.

The rotatable clutch member 20 has a plurality of pinion gear-like teeth 30 formed on the outer periphery thereof with each tooth 30 being disposed on a bias relative to the axis of rotation of the member 20 as illustrated.

The rotatable clutch member 20 also carries an unlatching member 31 which causes unlatching of the clutch construction 15 when the particular selected time period has elapsed in the manner fully set forth in the aforementioned U.S. Patent to Neimand, No. 3,652,870 whereby the unlatching member 31 and its operation need not be further described.

The rotatable clutch member 20 is provided with ninety-two equally spaced teeth 30 to cooperate with the teeth or legs 24 of the rotatable clutch member 19 in a manner hereinafter described.

While the rotatable member 20 can be formed of any suitable material, the same can be formed of the aforementioned plastic material, if desired, and thereby be a one-piece molded structure.

Therefore, is can be seen that the two clutch members 19 and 20 that form the clutch construction 15 of this invention can be formed in a relatively simple manner by merely the molding of plastic material into the configurations illustrated so that the clutch construction 15 can readily operate in the timer construction 10 in a manner now to be described.

As previously stated and in the manner set forth in the aforementioned patent to Neimand, No, 3,652,870, the timer motor 14 continuously rotates the clutch member 19 of the clutch 15 and as long as the clutch member 20 is out of engagement with the clutch member 19, the time period unit 16 is in the off condition thereof as illustrated in FIG. 1.

However, when the operator desires to utilize the timer construction 10 to provide a selected time period, the operator grasps the knob 19 and turns the same to the desired time period, such as 5 minutes, and then pushes inwardly on the selector button 18 which causes the clutch member 20 to be axially moved therewith toward the rotatable member 19 in such a manner that the rotatable member 20 is moved into the circular array of teeth or legs 24 of the member 19 which through its ring-gear like arrangement meshes with certain of the teeth 30 of the member 20 to cause the member 19 to now drive the member 20 in unison therewith as long as the clutch member 19 and 20 are disposed in meshing relation, the clutch member 20 remaining in meshing relation with the clutch member 19 until the selected time period has elapsed at which time the unlatching member 31 of the clutch member 20 trips suitable locking structure (not shown) which causes the rotatable clutch member 20 to move outwardly to the unclutched condition illustrated in FIG. 1 and thereby terminate the operation of the timer unit 16. At this time, the timer construction 10 can ring a bell or the like and will remain in its "off" condition until reset in the manner previously set forth.

It is believed that by arranging the teeth 24 and 30 of the clutch members 19 and 20 of this invention in the particular configuration illustrated and described, improved repeatability and accuracy of the clutch construction 15 for the timer 10 is provided.

In particular, with an odd ratio of number of teeth 30 on the clutch member 20 to the number of teeth or legs 24 on the clutch member 19, there becomes evident an inherent angular discrepancy at any point during engagement of these two mating clutch members 19 and 20 when the clutch member 20 is first moved into the circular array of legs 24. For example, if the clutch member 19 has thirty legs 24 and the rotatable clutch member 20 has ninety-two teeth 30, the angle between two successive legs 24 will be approximately 12 degrees and the angle between two successive teeth 30 of the member 20 will be approximately 3.913 degrees. Therefore, four teeth 30 on the member 20 will yield an angle greater than 12 degrees between two legs 24. However, three teeth 30 on the member 20 yield an angle less than 12 degrees and it is the difference between these two angles that the aforementioned discrepancy becomes apparent. Accordingly, for this example, this becomes 12 degrees minus (3) times (3.913) degrees and equals 0.261 degrees. Thus, the greatest theoretical error in terms of time would be 0.261 degrees divided by 12 degrees times the time it takes to go through an angular displacement of 12 degrees.

Accordingly, increasing the number of teeth 30 and/or legs 24 would increase the accuracy of the timer, or decrease the angular discrepancy. Likewise, decreasing the number of legs 24 and/or teeth 30 would decrease the accuracy of the timer and increase the angular discrepancy.

Therefore, when the clutch member 20 is first clutched into the circular array of teeth 24 of the clutch member 19, any interference between the teeth 30 of the member 20 and the legs 24 of the member 19 will cause the legs 24 to bend out of the way due to the flexibility of the legs 24 in the areas where interference condition may occur during initial engagement.

It is of course to be understood that the operation and/or accuracy (repeatability) of the clutch construction 15 will not vary significantly whether or not the rotatable member 19 is being continuously turned by the timer motor 14 or only when the timer 10 is to be operated for the selected time period.

It is believed that the clutch construction 15 of this invention will not provide any slippage because of the positive engagement of the clutch members 19 and 20 thereof.

Therefore, it can be seen that this invention not only provides an improved timer construction, but also this invention provides an improved clutch construction for such a timer construction or the like.

While the form of the invention now preferred has been illustrated and described as required by the Patent Statute, it is to be understood that other forms can be utilized and still fall within the scope of the appended claims.

What is claimed is:

1. In a timer construction having a timer motor and a selectable time period means adapted to be interconnected to said timer motor by a clutch means to drive said time period means for a selected time period, said clutch means comprising a first rotatable member driven by said timer motor and having a plurality of teeth arranged in a ring-gear like circular array, and a second rotatable member being axially movable and having a plurality of teeth on the outer periphery thereof, said rotatable members each having an axis of rotation, said second member being operatively interconnected to said time period means and being adapted to have some of its said teeth mesh with at least some of said teeth of said first member to be driven thereby when said second member is axially moved into said circular array of said teeth of said first member, the improvement wherein each tooth of said first member comprises a leg having opposed ends of which one end thereof is secured to said first member and the other end thereof is disposed in cantilever fashion relative to said first member, each leg having a tooth face that extends between said ends thereof and is substantially flat, each said tooth face facing at an angle to said axis of rotation of said first member, each said tooth face having an inner edge that is angled relative to said axis of rotation of said first member, said first member having a flat surface disposed substantially perpendicular to said axis of rotation thereof, said legs being secured to said flat surface and extending substantially perpendicular thereto.

2. A timer construction as set forth in claim 1 wherein said teeth of said first member are flexible.

3. A timer construction as set forth in claim 2 wherein said second member has ninety-two teeth, said first member having thirty teeth.

4. A timer construction as set forth in claim 1 wherein said second member has a greater number of teeth than the number of teeth of said first member.

5. A timer construction as set forth in claim 1 wherein said teeth of said first member are disposed substantially equally spaced and radially about said axis of rotation thereof.

6. A timer construction as set forth in claim 5 wherein said teeth of said second member are disposed at a bias to said axis of rotation thereof.

7. In a clutch construction having clutch means for interconnecting a drive means to a driven means, said clutch means comprising a first rotatable member driven by said drive means and having a plurality of teeth arranged in a ring-gear like circular array, and a second rotatable member being axially movable and having a plurality of teeth on the outer periphery thereof, said rotatable members each having an axis of rotation, said second member being operatively interconnected to said driven means and being adapted to have some of its said teeth mesh with at least some of said teeth of said first member to be driven thereby when said second member is axially moved into said circular array of said teeth of said first member, the improvement wherein each tooth of said first member comprises a leg having opposed ends of which one end thereof is secured to said first member and the other end thereof is disposed in cantilever fashion relative to said first member, each leg having a tooth face that extends between said ends thereof and is substantially flat, each said tooth face facing at an angle to said axis of rotation of said first member, each said tooth face having an inner edge that is angled relative to said axis of rotation of said first member, said first member having a flat surface disposed substantially perpendicular to said axis of rotation thereof, said legs being secured to said flat surface and extending substantially perpendicular thereto.

8. A clutch construction as set forth in claim 7 wherein said teeth of said first member are flexible.

9. A clutch construction as set forth in claim 8 wherein said second member has ninety-two teeth, said first member having thirty teeth.

10. A clutch construction as set forth in claim 7 wherein said second member has a greater number of teeth than the number of teeth of said first member.

11. A clutch construction as set forth in claim 7 wherein said teeth of said first member are disposed substantially equally spaced and radially about said axis of rotation thereof.

12. A clutch construction as set forth in claim 11 wherein said teeth of said second member are disposed at a bias to said axis of rotation thereof.

* * * * *